United States Patent [19]

Maeoka et al.

[11] Patent Number: 4,529,647

[45] **Date of Patent: * Jul. 16, 1985**

[54] RADIOGRAPHIC IMAGE CONVERSION SCREENS

[75] Inventors: Hidehiko Maeoka; Etsuo Shimizu, both of Tokyo; Yujiro Suzuki, Odawara; Keiji Shimiya, Hiratsuka; Norio Miura, Isehara, all of Japan

[73] Assignee: Kasei Optonix, Ltd., Tokyo, Japan

[ * ] Notice: The portion of the term of this patent subsequent to Dec. 4, 2001 has been disclaimed.

[21] Appl. No.: 587,608

[22] Filed: Mar. 8, 1984

Related U.S. Application Data

[60] Division of Ser. No. 429,031, Sep. 30, 1982, abandoned, which is a continuation-in-part of Ser. No. 376,020, May 7, 1982, abandoned.

[30] Foreign Application Priority Data

Mar. 15, 1982 [JP] Japan .............................. 57-39310

[51] Int. Cl.[3] ...................... B32B 5/16; B32B 15/08; G01J 1/58

[52] U.S. Cl. .............................. 428/323; 250/483.1; 250/486.1; 428/341; 428/457; 428/458; 428/690; 428/691

[58] Field of Search .............. 428/690, 691, 328, 329, 428/340, 457, 458, 469, 472, 323, 341; 250/483.1, 486.1

[56] References Cited

U.S. PATENT DOCUMENTS

| | | | |
|---|---|---|---|
| 3,294,569 | 12/1966 | Messineo et al. | 428/690 |
| 3,872,309 | 3/1975 | DeBelder et al. | 250/486.1 |
| 3,936,644 | 2/1976 | Rabatin | 250/486.1 |
| 4,224,524 | 9/1980 | Suys et al. | 250/486.1 |

*Primary Examiner*—Thomas J. Herbert
*Attorney, Agent, or Firm*—Oblon, Fisher, Spivak, McClelland & Maier

[57] ABSTRACT

A radiographic image conversion screen comprising a support, a first fluorescent layer formed on the support and consisting essentially of a blue emitting phosphor and a second fluorescent layer formed on the first fluorescent layer and consisting essentially of a green emitting rare earth oxysulfide phosphor. The green emitting rare earth oxysulfide phosphor is represented by the formula: $(Ln_{1-i}, Yi, Tba, Rb)_2O_2S$ where Ln is at least one element selected from the group consisting of La, Ga and Lu, R is at least one element selected from the group consisting of Dy, Pr, Yb and Nd, and i, a and b are numbers within the ranges of $0 \leqq i \leqq 0.35$, $0.0005 \leqq a \leqq 0.09$ and $0.0002 \leqq b \leqq 0.01$ respectively.

7 Claims, 7 Drawing Figures

RADIOGRAPHIC IMAGE CONVERSION SCREENS

This is a division of application Ser. No. 429,031, filed Sept. 30, 1982, now abandoned which is a continuation-in-part of application Ser. No. 376,020 filed May 7, 1982 now adandoned.

BACKGROUND OF THE INVENTION

1. Field of the Invention

The present invention relates to a radiographic image conversion screen. More particularly, it relates to a radiographic image conversion screen, i.e. a radiographic intensifying screen (hereinafter referred to simply as "intensifying screen") or a fluorescent screen, which comprises double phosphor layers i.e. a green emitting rare earth oxysulfide phosphor layer and a blue emitting phosphor layer and which has a high speed and exhibits superior image forming characteristics (in this specification, the "radiographic image conversion screen" includes the intensifying screen and the fluorescent screen).

2. Description of the Prior Art

As is well known, a radiographic image conversion screen is used for medical diagnosis and non-destructive inspection of industrial products. The screen emits an ultraviolet ray or a visible ray upon absorption of radiation passed through an object, and thus converts a radiographic image to an ultraviolet image or a visible image.

When the radiographic image conversion screen is used as an intensifying screen for radiography, it is fit on a radiographic film (hereinafter referred to simply as "film") so that a radiation image will be converted to an ultraviolet image or visible image on the fluorescent surface of the intensifying screen which will then be recorded on the film. On the other hand, when it is used as a fluorescent screen, the radiation image of the object converted on the fluorescent surface of the fluorescent screen to a visible image may be photographed by a photographic camera or may be projected on a television screen by means of a television camera tube, or the visible image thus formed may be observed by naked eyes.

Basically, the radiographic image conversion screen comprises a support made of e.g. paper or a plastic sheet and a fluorescent layer formed on the support. The fluorescent layer is composed of a binder and a phosphor dispersed in the binder and is capable of efficiently emitting light when excited by the radiation of e.g. X-rays, and the surface of the fluorescent layer is usually protected by a transparent protective layer.

For medical diagnosis by means of radiography, a high speed radiographic system (i.e. a combination of a film and an intensifying screen) is desired to minimize the patient's dosage. At the same time, a radiographic system is desired which is capable of providing good image quality (i.e. sharpness, granularity and contrast) suitable for diagnosis by clinical photography. Accordingly, the intensifying screen is desired to have a high speed and to provide superior sharpness, granularity and contrast. Likewise in the case of a fluorescent screen, it is desired to have a high speed and to provide particularly good contrast so that it is thereby possible to minimize the patient's dosage and at the same time to obtain an image having good image quality.

As high speed radiographic image conversion screens, there have been developed radiographic image conversion screens comprising a rare earth oxysulfide phosphor, such as one wherein a terbium-activated rare earth oxysulfide phosphor which is a green emitting phosphor and represented by the formula $(Ln, Tb)_2O_2S$ where Ln is at least one selected from lanthanum, gadolinium and lutctium, is used (U.S. Pat. No. 3,725,704), and one wherein a terbium-activated yttrium oxysulfide which is a blue emitting phosphor and represented by the formula $(Y, Tb)_2O_2S$, is used (U.S. Pat. No. 3,738,856). Among them, intensifying screens using a green emitting rare earth oxysulfide phosphor co-activated with terbium and one or more of dysprosium, praseodymium, ytterbium and neodymium, and represented by the formula $(Ln_{1-i}, Y_i, Tb, R)_2O_2S$ where Ln is at least one element selected from the group consisting of La, Gd and Lu, R is at least one element selected from the group consisting of Dy, Pr, Yb and Nd, and i is the numbers within the ranges of $0 \leqq i \leqq 0.35$, respectively (hereinafter referred to simply as "a green emitting rare earth oxysulfide phosphor"), have a speed several times higher than the speed of commonly used conventional intensifying screens using a calcium tungstate phosphor represented by the formula $CaWO_4$ and they have relatively good granularity as compared to other high speed intensifying screens. Therefore, they are utilized in high speed radiographic systems in combination with an orthochromatic-type (hereinafer referred to simply as "ortho-type") X-ray film having a wide spectral sensitivity ranging from a blue region to a green region. Meanwhile, in the recent high speed radiographic systems based on a combination of a green emitting rare earth intensifying screen and an ortho-type film, there is a tendency to use a low speed ortho-type film utilizing fine silver halide grains in order to minimize the amount of silver used for the film and to improve the image quality, particularly the granularity, at a high speed level. It is therefore strongly desired to further improve the speed of the intensifying screen with a view to reduction of the patient's dosage and at the same time to improve the sharpness of the intensifying screen, which tends to be reduced with an increase of the speed.

Among the green emitting phosphors, a phosphor using gadolinium oxysulfide as a host material is particularly preferably used for a high speed intensifying screen. However, it has a K absorption edge at 50.2 KeV, and accordingly, the intensifying screen using it has drawbacks that the contrast thereby obtainable within the X-ray tube voltage range commonly used for medical diagnosis (i.e. from 60 to 140 KVp) is inferior due to the X-ray absorbing characteristics of such a phosphor. Moreover, the speed of the intensifying screen changes as a function of changes in the tube voltage, which changes can be substantial, thus leading to difficulties in determining the condition of radiography.

SUMMARY OF THE INVENTION

It is an object of the present invention to overcome the above mentioned difficulties in the conventional radiographic diagnosis systems wherein radiographic image conversion screens are used, and to provide a radiographic image conversion screen which, when used as an intensifying screen in combination with an ortho-type film, has a speed at least equal to the speed of the conventional intensifying screens using a green emitting rare earth oxysulfide phosphor and is capable of providing an image having superior image quality, particularly superior sharpness and contrast without degradation of the granularity, and which is less dependent in its speed on the X-ray tube voltage as compared with the conventional intensifying screens.

Another object of the present invention is to provide a radiographic image conversion screen which, when used as a fluorescent screen in association with a photographic camera or an X-ray television system, has a speed at least equal to the speed of a conventional fluorescent screen using a green emitting rare earth oxysulfide phosphor and is capable of providing an image having an improved contrast over the conventional fluorescent screen.

As a result of extensive studies on various phosphors used for the fluorescent layers of the radiographic image conversion screens and various combinations thereof, the present inventors have found that the above objects can be accomplished by using a combination of a green emitting rare earth oxysulfide phosphor and a phosphor capable of emitting blue light upon exposure to radiation in such a manner as to form a double layer structure wherein a fluorescent layer composed of the green emitting rare earth oxysulfide phosphor is disposed on the surface side (i.e. the output side of the emitted light) and a fluorescent layer composed of the blue emitting phosphor is disposed on the side facing a support.

Thus, the present invention provides a radiographic image conversion screen which comprises a support, a first fluorescent layer formed on the support and consisting essentially of a blue emitting phosphor and a second fluorescent layer formed on the first fluorescent layer and consisting essentially of a green emitting rare earth oxysulfide phosphor.

The radiographic image conversion screen of the present invention has a fluorescent layer composed essentially of a blue emitting phosphor interposed between the support and the fluorescent layer composed essentially of a green emitting rare earth oxysulfide phosphor represented by the formula $(Ln_{1-i-a-b}, Y_i, Tb_a, R_b)_2O_2S$ where Ln is at least one element selected from the group consisting of La, Gd and Lu, R is at least one element selected from the group consisting of Dy, Pr, Yb and Nd, and i, a and b are the numbers within the ranges of $0 \leqq i \leqq 0.35$, $0.0005 \leqq a \leqq 0.09$ and $0.0002 \leqq b \leqq 0.01$, respectively. Thus, the screen is capable of emitting blue and green lights. It has a speed at least equal to the speed of the conventional radiographic image conversion screens comprising only the green emitting rare earth oxysulfide phosphor layer. Further, it provides an image having superior image quality, particularly superior contrast, as compared with the conventional radiographic image conversion screens, and when used as an intensifying screen in combination with an ortho-type film, it provides improved sharpness over the conventional intensifying screens and the dependability of its speed against the X-ray tube voltage is thereby improved.

BRIEF DESCRIPTION OF THE DRAWINGS

FIGS. 4 and 5 are graphs illustrating emission spectra according to the radiographic image conversion screens of the present invention.

FIGS. 5 and 6 are graphs illustrating the relative speed and relative sharpness, respectively, dependent on the proportion of the blue emitting phosphor in the radiographic image conversion screens of the present invention.

DETAILED DESCRIPTION OF THE PREFERRED EMBODIMENTS

Figure 1:
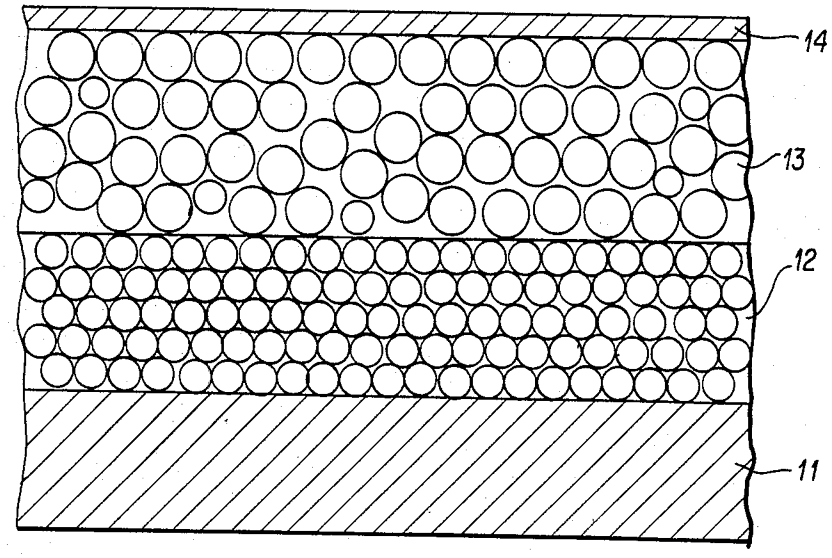
FIGS. 1 and 2 are diagrammatic cross sectional views of the radiographic image conversion screens of the present invention.

The radiographic image conversion screen of the present invention can be prepared in the following manner.

Firstly, suitable amounts of the blue emitting phosphor and a binder resin such as nitrocellulose are mixed, and a suitable amount of a solvent is added to the mixture to obtain a coating dispersion of the phosphor having an optimum viscosity. The coating dispersion of the phosphor is applied onto a support made of e.g. paper or plastic by means of a doctor blade, roll coater or knife coater. In some intensifying screens, a reflective layer such as a white pigment layer, an absorptive layer such as a black pigment layer or a metal foil layer is interposed between the fluorescent layer and the support. Likewise, when the radiographic image conversion screen of the present invention is to be used as an intensifying screen, a reflective layer, an absorptive layer or a metal foil layer may be preliminarily formed on a support and then a blue emitting phosphor layer may be formed thereon in the above mentioned manner. Then, a coating dispersion comprising a green emitting rare earth oxysulfide phosphor and a binder resin such as nitrocellulose, is prepared in the same manner as described above, and the coating dispersion thus prepared is applied onto the blue emitting phosphor layer to form a fluorescent layer composed essentially of the green emitting rare earth oxysulfide phosphor. The support thus coated with the two phosphor layers capable of emitting lights of different colours, is then subjected to drying to obtain a radiographic image conversion screen of the present invention. In most cases, radiographic image conversion screens are usually provided with a transparent protective layer on the fluorescent layer. It is preferred also in the radiographic image conversion screens of the present invention to provide a transparent protective layer on the fluorescent layer composed essentially of the green emitting rare earth oxysulfide phosphor.

In a case where the green emitting rare earth oxysulfide phosphor to be used has a mean grain size or specific gravity substantially greater than the mean grain size or specific gravity of the blue emitting phosphor to be used, the process may advantageously be modified in such a manner that firstly a protective layer is formed on a flat substrate such as a glass palte or a plastic sheet, and then a coating dispersion composed of a mixture comprising the green emitting rare earth oxysulfide phosphor, the blue emitting phosphor and a binder resin, is coated on the protective layer and gradually dried at room temperature while controlling the ambient atmosphere. During this step of drying the coating dispersion, the green emitting rare earth oxysulfide phosphor grains having a greater mean grain size or specific gravity will settle to form an underlayer while the blue emitting phosphor grains having a smaller mean grain size or specific gravity are pushed upwardly to form a top layer, whereby two separate fluorescent layers, i.e. a top layer composed essentially of the blue emitting phosphor and an underlayer composed essentially of the green emitting rare earth oxysulfide phosphor, are obtainable. Then, the integrally formed protective and fluorescent layers are peeled off from the substrate, and placed on a support so that the top layer composed essentially of the blue emitting phosphor is brought in contact with and fixed to the support, whereby a radiographic image conversion screen of the present invention, is obtainable. In this case, the separation between the green emitting rare earth oxysulfide phosphor grains and the blue emitting phosphor grains may not be complete, i.e. a certain minor amount of the green emitting rare earth oxysulfide phosphor grains may be present in the fluorescent layer composed essentially of the blue emitting phosphor and likewise a certain minor amount of the blue emitting phosphor grains may be present in the fluorescent layer composed essentially of the green emitting rare earth oxysulfide phosphor. It has been confirmed that so long as the first fluorescent layer, i.e. the layer adjacent to the support, is composed essentially of the blue emitting phosphor and the second fluorescent layer, i.e. the layer on the surface side (i.e. the emission output side) is composed essentially of the green emitting rare earth oxysulfide phosphor, the radiographic image conversion screen thereby obtainable has characteristics substantially equal to the characteristics of the above mentioned radiographic image conversion screen obtained by separately coating the blue emitting phosphor layer and the green emitting rare earth oxysulfide phosphor layer on the support.

FIG. 1 shows a diagrammatic cross sectional view of a radiographic image conversion screen of the present invention prepared in the above mentioned manners. A first fluorescent layer 12 consisting essentially of a blue emitting phosphor is provided on a support 11, and a second fluorescent layer 13 consisting essentially of a green emitting rare earth oxysulfide phosphor is formed on the first fluorescent layer 12. Reference numeral 14 designates a transparent protective layer formed on the surface of the second fluorescent layer 13.

Further, the blue emitting phosphor layer of the radiographic image conversion screen of the present invention may be formed in such a manner that firstly the blue emitting phosphor grains are classified into a plurality of groups having different mean grain sizes by means of a proper phosphor grain separation means such as levigation, and the groups of the phosphor grains thus classified are respectively dispersed in a proper binder resin and sequentially applied onto the support and dried so that the phosphor grains having a similar mean grains are coated first, whereby the blue emitting phosphor layer is formed to have a grain size distribution of the phosphor grains such that the grain size becomes smaller gradually from the side facing the green emitting rare earth oxysulfide phosphor layer to the side facing the support.

Figure 2:
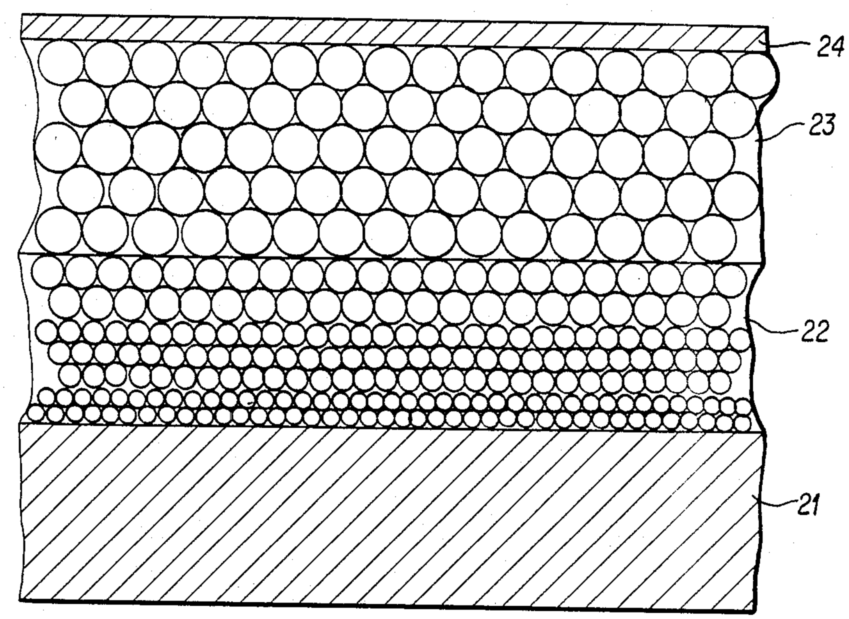

FIG. 2 shows a diagrammatic cross sectional view of a radiographic image conversion screen of the present invention prepared in the above mentioned manner. A first fluorescent layer 22 composed essentially of a blue emitting phosphor, a second fluorescent layer 23 composed essentially of a green emitting rare earth oxysulfide phosphor and a transparent protective layer 24 are laminated in this order on a support 21. The blue emitting phosphor grains in the first layer 22 are arranged in such a manner that the phosphor grain size becomes smaller gradually from the side facing the green emitting rare earth oxysulfide phosphor layer 23 toward the side facing the support 21. Such a radiographic image conversion screen provides substantially improved sharpness over the radiographic image conversion screens illustrated in FIG. 1.

The green emitting rare earth oxysulfide phosphors which may be used in the radiographic image conversion screens of the present invention are rare earth coactivated rare earth oxysulfide phosphor represented by the formula $(Ln_{1-i-a-b}, Y_i, Tb_a, R_b)_2O_2S$ where Ln is at least one element selected from the group consisting of lanthanum, gadolinium and lutetium, R is at least one element selected from the group consisting of dysprosium, praseodymium, ytterbium and neodymium, and i, a and b are numbers within the ranges of $0 \leqq i \leqq 0.35$, $0.0005 \leqq a \leqq 0.09$ and $0.0002 \leqq b \leqq 0.01$, respectively.

Any blue emitting phosphor may be used for the radiographic image conversion screens of the present invention so long as it is a phosphor capable of emitting blue light with high efficiency when excited by radiation such as X-ray radiation. In practice, however, in view of the speed of the obtainable radiographic image conversion screen and the sharpness of the image thereby obtainable, it is preferred to use at least one selected from the group consisting of a yttrium or yttrium-gadolinium oxysulfide phosphor represented by the formula $(Y_{1-c-d-e}, Gd_c, Tb_d, Tm_e)_2O_2S$ where c, d and e are numbers within the ranges of $0 \leqq c \leqq 0.60$, $0.0005 \leqq d \leqq 0.02$ and $0 \leqq e \leqq 0.01$, respectively; an alkaline earth metal complex halide phosphor represented by the formula $MeF_2 \cdot pMe'X_2 \cdot qKX' \cdot rMe''SO_4{:}mEu^{2+}, nTb^{3+}$ where Me is at least one selected from magnesium, calcium, strontium and barium, each of Me' and Me'' is at least one selected from calcium, strontium and barium, each of X and X' is at least one selected from chlorine and bromine, and p, q, r, m and n are numbers within the ranges of $0.80 \leqq p \leqq 1.5$, $0 \leqq q \leqq 2.0$, $0 \leqq r \leqq 1.0$, $0.001 \leqq m \leqq 0.10$ and $0 \leqq n \leqq 0.05$, respectively; a rare earth oxyhalide phosphor represented by the formula $(Ln'_{1-x-y-z}, Tb_x, Tm_y, Yb_z)OX$ where Ln' is at least one selected from lanthanum and gadolinium, X is at least one selected from chlorine and bromine, and x, y and z are numbers within the ranges of $0 \leqq x \leqq 0.01$, $0 \leqq y \leqq 0.01$, $0 \leqq z \leqq 0.005$ and $0 < x + y$; a divalent metal tungstate phosphor represented by the formula $M^{II}WO_4$ where $M^{II}$ is at least one selected from magnesium, calcium, zinc and cadmium; a zinc sulfide or zinc-cadmium sulfide phosphor represented by the formula $(Zn_{1-j}, Cd_j)S{:}Ag$ where j is a number within the range of $0 \leqq j \leqq 0.4$; and a rare earth tantalate or tantalumniobate phosphor represented by the formula $(Ln''_{1-v}, Tm_v)(Ta_{1-w}, Nb_w)O_4$ where Ln'' is at least one selected from lanthanum, yttrium, gadolinium and lutctium, and v and w are numbers within the ranges of $0 \leqq v \leqq 0.1$ and $0 \leqq w \leqq 0.3$, respectively.

In the radiographic image conversion screens of the present invention, in view of the speed of the obtainable radiographic image conversion screen and the sharpness of the image thereby obtainable, the phosphor to be used for the blue emitting phosphor layer, preferably has a mean grain size of from 2 to 10μ, more preferably from 3 to 6μ, and a standard deviation of from 0.20 to 0.50, more preferably from 0.30 to 0.45, as represented by the quartile deviation, and the phosphor to be used for the green emitting rare earth oxysulfide phosphor layer preferably has a mean grain size of from 5 to 20μ, more preferably from 6 to 12μ and a standard deviation of from 0.15 to 0.40, more preferably from 0.20 to 0.35, as represented by the quartile deviation. Likewise in view of the speed of the obtainable radiographic image conversion screen and the sharpness of the image thereby obtainable, the coating weight of the phosphor in the blue emitting phosphor layer and the coating weight of the phosphor in the green emitting rare earth oxysulfide phosphor layer are preferably from 2 to 100 $mg/cm^2$ and from 5 to 100 $mg/cm^2$, respectively and more preferably from 3 to 50 $mg/cm^2$ and from 20 to 80 $mg/cm^2$, respectively. In view of the sharpness of the image obtainable, it is preferred that the mean grain size of the phosphor grains in the blue emitting phosphor layer is smaller than the mean grain size of the phosphor grains in the green emitting rare earth oxysulfide phosphor layer.

Figure 3:
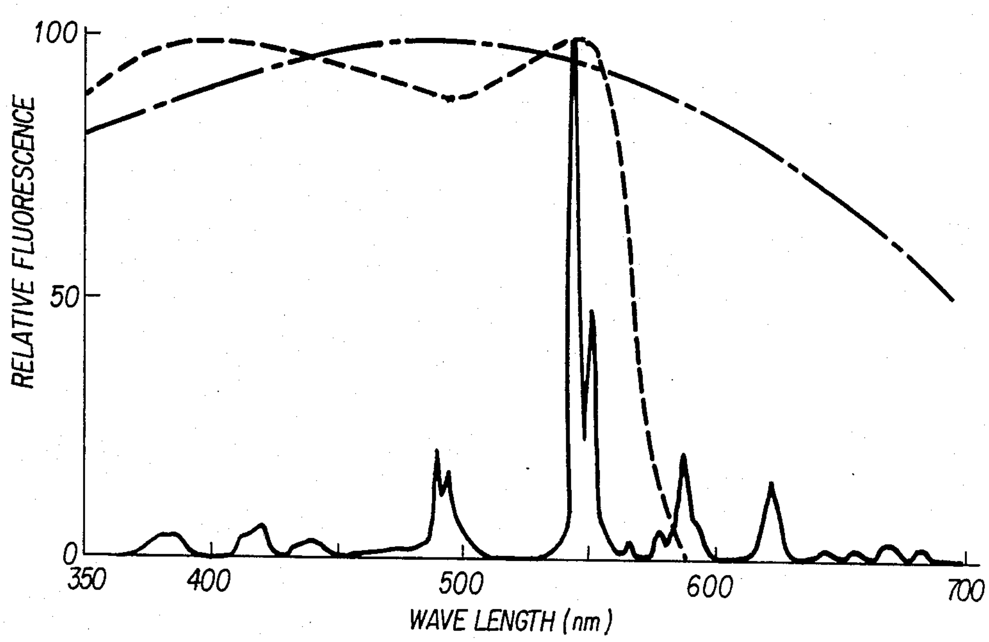
FIG. 3 is a graph illustrating an emission spectrum according to a conventional radiographic image conversion screen.
Figure 4:
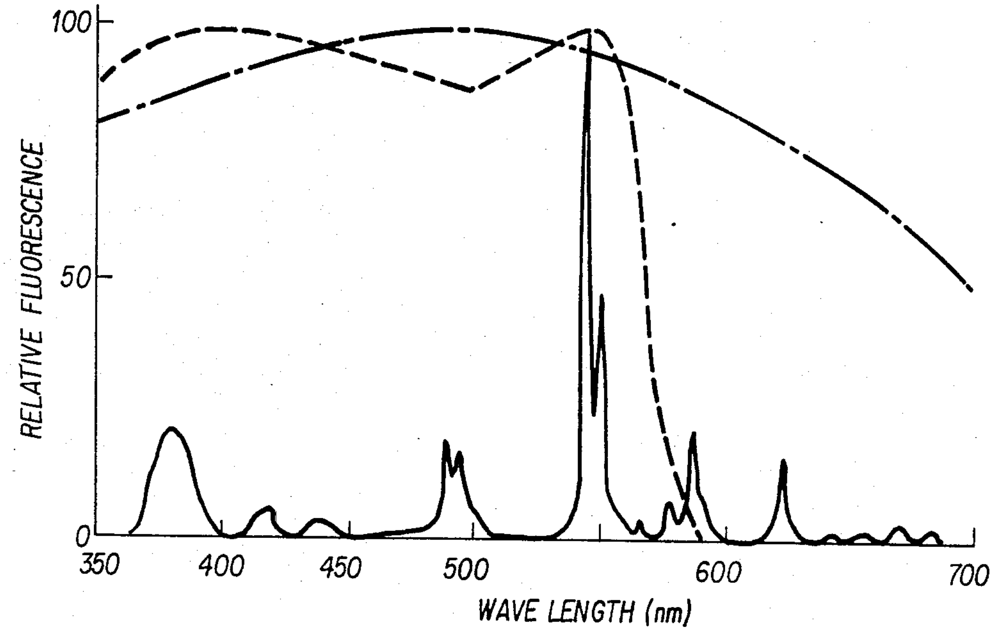
FIG. 4 is a graph illustrating an emission spectrum according to the radiographic image conversion screen of the present invention.

FIG. 3 shows an emission spectrum according to a conventional radiographic image conversion screen comprising a single fluorescent layer composed solely of $(Gd_{0.994}, Tb_{0.005}, Dy_{0.001})_2O_2S$ phosphor as one of green emitting rare earth oxysulfide phosphors. FIG. 4 show emission spectra obtained by the radiographic image conversion screens of the present invention. In the radiographic image conversion screen illustrated in FIG. 4, the blue emitting phosphor layer (the coating weight of the phosphor: 15 $mg/cm^2$) is composed of $(BaF_2 \cdot BaCl_2 \cdot 0.1KCl \cdot 0.1BaSO_4 : 0.06\ Eu^{2+})$ phosphor and the green emitting rare earth oxysulfide phosphor layer (the coating weight of the phosphor: 35 $mg/cm^2$) is composed of $(Gd_{0.994}, Tb_{0.005}, Dy_{0.001})_2O_2S$ phosphor. In each of FIGS. 3 and 4, the broken line and the alternate long and short dash line indicate a spectral sensitivity curve of an ortho-type film and a spectral sensitivity curve of an image tube, respectively. It is apparent from the comparison of FIG. 3 with FIG. 4, that the radiographic image conversion screen of the present invention has a wide emission distribution ranging from the green region to the blue region or the near ultraviolet region and better matches the spectral sensitivities of the ortho-type film and the photo-cathode of the image tube than the conventional radiographic image conversion screen comprising a single fluorescent layer composed solely of the green emitting rare earth oxysulfide phosphor. It is particularly advantageous in view of its high speed.

Figure 5:
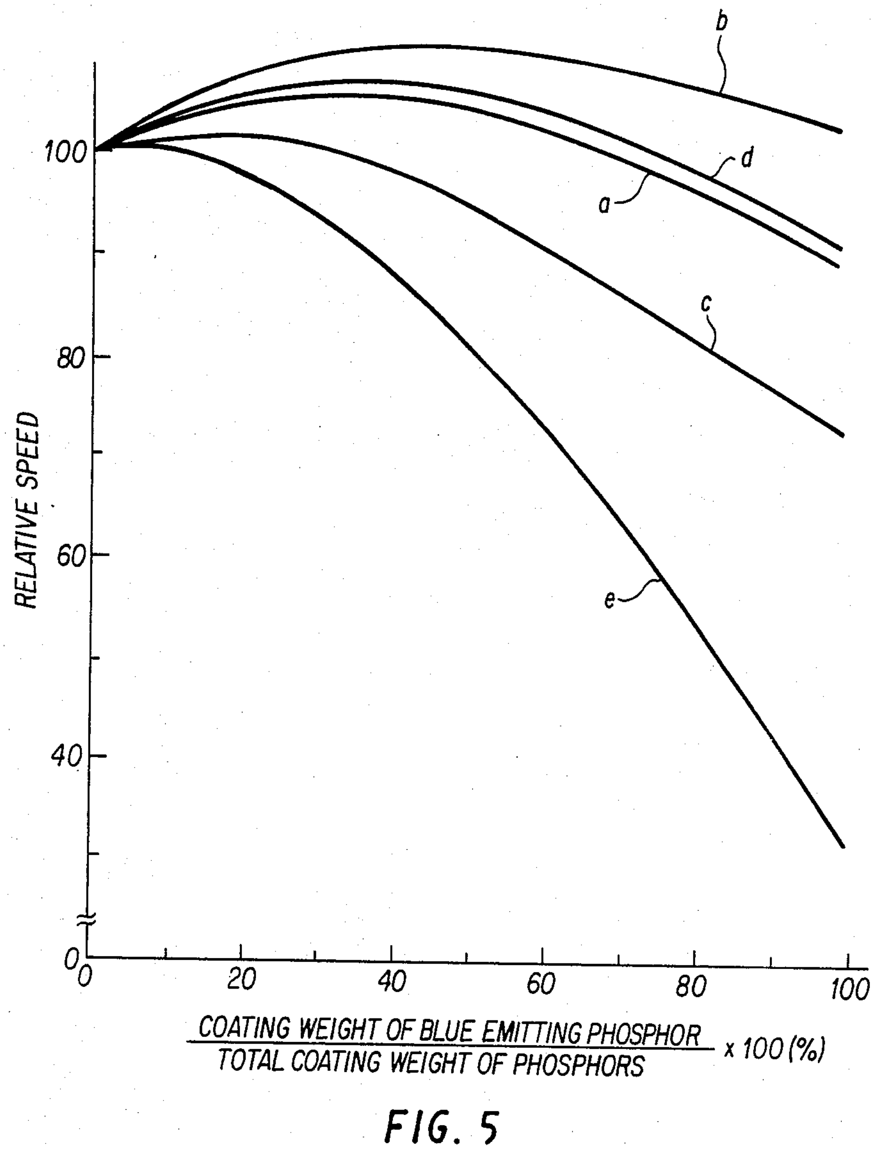

FIG. 5 illustrates a relation between the ratio (represented by percentage) of the coating weight of the phosphor in the blue emitting phosphor layer to the coating weight of the total phosphor in the entire fluorescent layers in the radiographic image conversion screens of the invention and the speed of the radiographic image conversion screens thereby obtained. The relative speed on the vertical axis indicates the speed obtained in combination with an ortho-type film, which is a relative value based on the speed of the screen having no blue emitting phosphor layer (i.e. comprising only the green emitting rare earth oxysulfide phosphor layer) where the latter speed is set at 100. The curves a, b, c, d and e represent the cases where the blue emitting phosphor layer is composed of $(Y_{0.998}, Tb_{0.002})_2O_2S$ phosphor, $(Gd_{0.5}, Y_{0.495}, Tb_{0.003}, Tm_{0.002})_2O_2S$ phosphor, $BaF_2 \cdot BaCl_2 \cdot 0.1KCl \cdot 0.1BaSO_4 : 0.06\ Eu^{2+}$ phosphor, $(La_{0.997}, Tb_{0.003})OBr$ phosphor, and $CaWO_4$ phosphor, respectively. In each case, the total coating weight of the fluorescent layers is 50 $mg/cm^2$, and the green emitting rare earth oxysulfide phosphor layer is composed of $(Gd_{0.994}, Tb_{0.005}, Dy_{0.001})_2O_2S$ phosphor.

Figure 6:
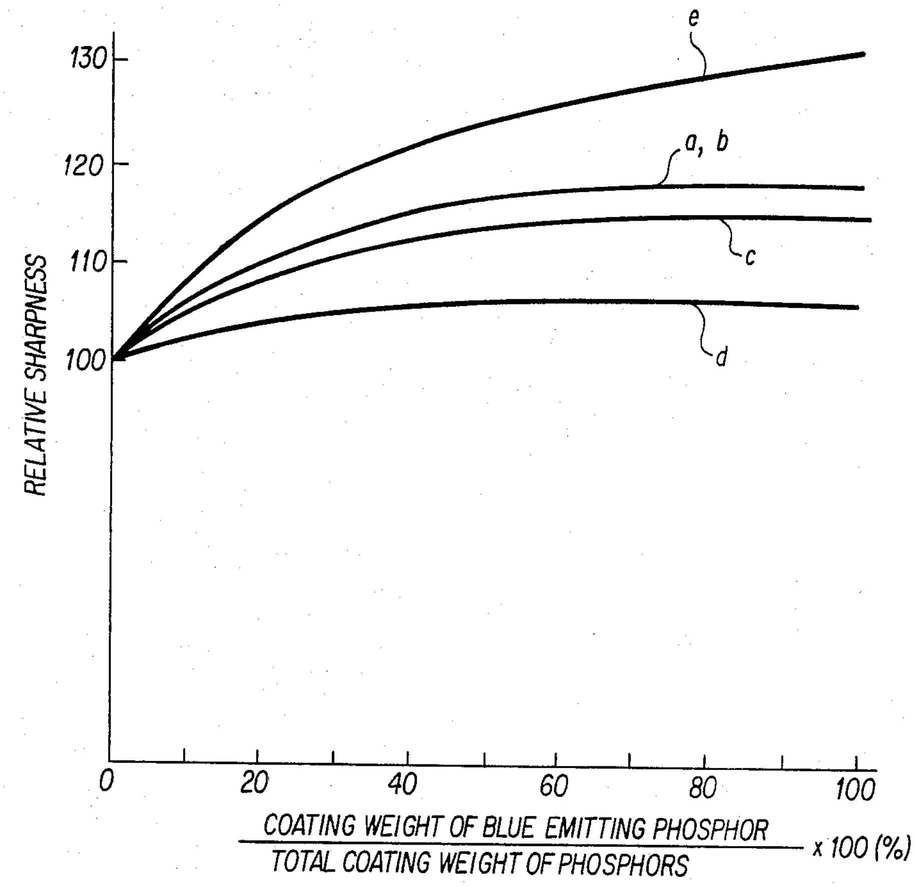

It is apparent from FIG. 6 that the optimum ratio of the coating weight of the blue emitting phosphor layer to the total coating weight of the phosphors varies depending upon the type of the blue emitting phosphor used. However, by providing a blue emitting phosphor layer beneath the green emitting rare earth oxysulfide phosphor layer composed of $(Gd, Tb, Dy)_2O_2S$ phosphor, it is possible to obtain a radiographic image conversion screen having a speed at least equal to the speed of the conventional radiographic image conversion screen comprising a single fluorescent layer composed solely of $(Gd, Tb, Dy)_2O_2S$ phosphor (i.e. comprising only the green emitting rare earth oxysulfide phosphor layer).

FIG. 6 illustrates a relation between the ratio (represented by percentage) of the coating weight of the phosphor in the blue emitting phosphor layer to the total coating weight of the phosphors in the entire fluorescent layers of the radiographic image conversion screens of the present invention and the sharpness of the radiographic image conversion screen. In FIG. 6, curves a, b, c, d and e represent the cases where the blue emitting phosphor layer is composed of $(Y_{0.998}, Tb_{0.002})_2O_2S$ phosphor, $(Gd_{0.5}, Y_{0.495}, Tb_{0.003}, Tm_{0.002})_2O_2S$ phosphor. $BaF_2 \cdot BaCl_2 \cdot 0.1KCl \cdot 0.1\ BaSO_4 : 0.06\ Eu^{2+}$ phosphor, $La_{0.997}, Tb_{0.003})OBr$ phosphor and $CaWO_4$ phosphor, respectively. In each case, the total coating weight of the fluorescent layers is 50 $mg/cm^2$ and the green emitting rare earth oxysulfide phosphor layer is composed of $(Gd_{0.994}, Tb_{0.005}, Dy_{0.001})_2O_2S$ phosphor. The sharpness of each radiographic image conversion screen is determined by obtaining a MTF value at a film density of 1.5 and spatial frequency of 2 lines/mm, and the MTF value is indicated as a relative value based on the MTF value of the radiographic image conversion screen having no blue emitting phosphor layer (i.e. comprising only the green emitting rare earth oxysulfide phosphor layer) where the latter MTF value is set at 100.

It is apparent from FIG. 6 that the radiographic conversion screens of the present invention provided with a blue emitting phosphor layer beneath the green emitting rare earth oxysulfide phosphor layer has improved sharpness over the conventional screen having no such a blue emitting phosphor layer.

Figure 7:
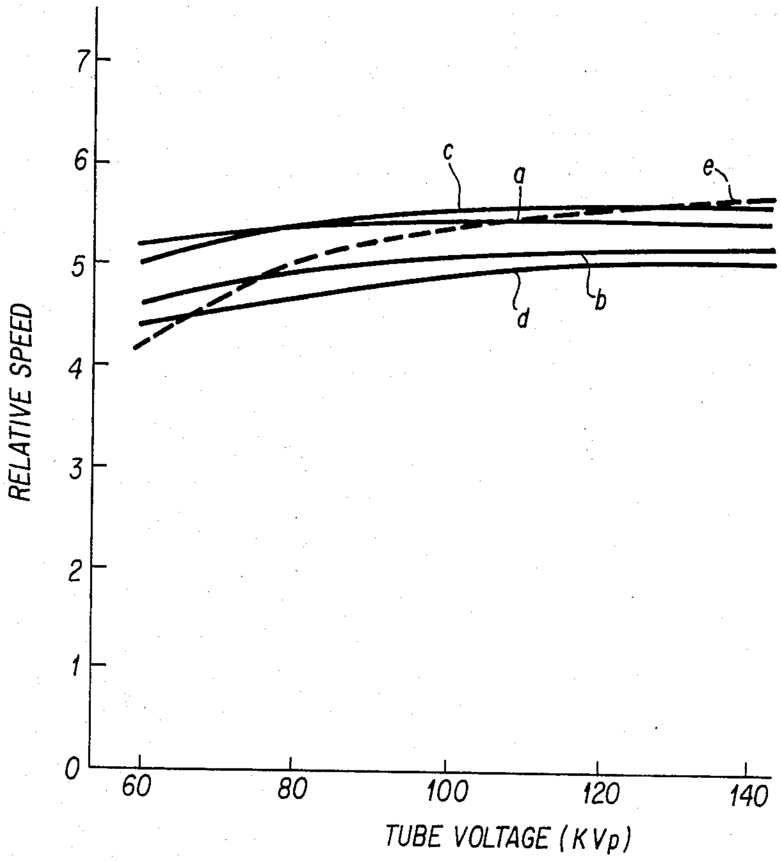
FIG. 7 is a graph illustrating the relative speeds of the radiographic image conversion screens of the present invention and the conventional radiographic image conversion screen, dependent on the X-ray tube voltage.

FIG. 7 is a graph illustrating the dependency of the speeds of the radiographic image conversion screens of the present invention and the conventional radiographic image conversion screen, on the X-ray tube voltage. In FIG. 7, curves a, b, c and d represent the speeds of the radiographic image conversion screens of the present invention in which the blue emitting phosphor layer is composed of $(Y_{0.998}, Tb_{0.002})_2O_2S$ phosphor, $BaF_2 \cdot BaCl_2 \cdot 0.1KCl \cdot 0.1BaSO_4 : 0.06\ Eu^{2+}$ phosphor, $(La_{0.997}, Tb_{0.003})OBr$ phosphor and $CaWO_4$ phosphor, respectively, and the green emitting rare earth oxysulfide phosphor layer is $(Gd_{0.994}, Tb_{0.005}, Dy_{0.001})_2O_2S$ phosphor in each case. In each case, the coating weight of the green emitting phosphor is 30 $mg/cm^2$ and the coating weight of the blue emitting phosphor is 20 $mg/cm^2$. Curve e represents the speed of the conventional radiographic image conversion screen wherein the fluorescent layer is composed solely of $(Gd_{0.994}, Tb_{0.005}, Dy_{0.001})_2O_2S$ and the coating weight of the phosphor is 50 mg/cm$^2$. The vertical axis of FIG. 7 indicates the relative speed obtained for several examples of combination of a radiographic image conversion screen with an ortho-type film against the speed of a radiographic conversion screen comprising a single fluorescent layer of $CaWO_4$ phosphor (as combined with a regular-type film). The relative value is spotted for every X-ray tube voltage.

It is seen from FIG. 7 that in the radiographic image conversion screens of the present invention, the change of the speed due to the variation of the X-ray tube voltage is less as compared with the conventional radiographic image conversion screen comprising a single fluorescent layer composed of $(Gd, Tb, Dy)_2O_2S$ phosphor, within the X-ray tube voltage range of from 60 to 140 KVp which is commonly used in the radiography for medical diagnosis.

Further, it has been confirmed that when green emitting rare earth oxysulfide phosphors other than $(Gd_{0.994}, Tb_{0.005}, Dy_{0.001})_2O_2S$ are used for the green emitting rare earth oxysulfide phosphor layer, or when the blue emitting phosphors other than $(Y_{0.998}, Tb_{0.002})_2O_2S$ phosphor, $BaF_2{\cdot}BaCl_2{\cdot}0.1KCl{\cdot}0.1BaSO_4{:}0.06\ Eu^{2+}$ phosphor, $(La_{0.997}, Tb_{0.003})OBr$ phosphor and $CaWO_4$ phosphor are used for the blue emitting phosphor layer, the radiographic image conversion screens thereby obtainable have a speed at least equal to the speed of the conventional screen comprising a single fluorescent layer composed solely of the green emitting rare earth oxysulfide phosphor, so long as the ratio of the coating weight of the phosphor in the blue emitting phosphor layer to the total coating weight of the entire phosphors falls within the specific range, as in the case of the radiographic image conversion screens illustrated in FIG. 5, and the sharpness can be improved and the dependency of the speed on the X-ray tube voltage can be reduced as compared with the conventional radiographic image conversion screen comprising a single fluorescent layer composed solely of the green emitting rare earth oxysulfide phosphor, as in the cases of the radiographic image conversion screens illustrated in FIGS. 6 and 7.

It has further been confirmed that the radiographic image conversion screens of the present invention provide improved contrast as compared with the conventional radiographic image conversion screens comprising only the green emitting rare earth oxysulfide phosphor layer. When used as fluorescent screens for X-ray television systems, they exhibit superior characteristics, especially in their speed and contrast, as compared with conventional fluorescent screens comprising only the green emitting rare earth oxysulfide phosphor layer.

Further, with respect of the granularity and sharpness of the obtainable radiographic image conversion screens, it has been confirmed that better characteristics are obtainable by providing a plurality of fluorescent layers so that the green emitting rare earth oxysulfide phosphor and the blue emitting phosphor constitute the respective separate fluorescent layers as in the radiographic image conversion screens of the present invention rather than simply mixing the phosphors.

In the radiographic image conversion screens of the present invention, not only the blue emitting phosphor layer but also the green emitting rare earth oxysulfide phosphor layer emits blue and/or ultraviolet rays to some extent. Accordingly, when used in combination with a regular type X-ray film, the screens exhibit superior characteristics.

As mentioned in the foregoing, the radiographic image conversion screens of the present invention have a speed at least equal to the speed of the conventional radiographic image conversion screens comprising only a green emitting rare earth oxysulfide phosphor layer and they provide improved sharpness and contrast without degradation of the image quality, particularly the granularity. Moreover, the speed of the present screen is less dependent on the X-ray tube voltage and thus provides an advantage in that radiographic operations can be simplified. Thus, the radiographic image conversion screens of the present invention have a high speed and provide an image of superior image quality. Thus, the present screen possesses considerable industrial value.

Now, the present invention will further be described with reference to Examples.

EXAMPLES 1 TO 3

Radiographic image conversion screens (1) to (3) were prepared in the following manner with use of the respective combinations of a green emitting rare earth oxysulfide phosphor and a blue emitting phosphor, as identified in Table 1 hereinafter.

Eight parts by weight of the blue emitting phosphor and one part by weight of nitrocellulose were mixed with use of a solvent to obtain a coating dispersion of the phosphor. This coating dispersion of the phosphor was uniformly coated by means of a knife coater, on a polyethylene terephthalate support provided on its surface with an absorptive layer of carbon black and having a thickness of 250μ so that the coating weight of the phosphor became as shown in Table 1 given hereinafter, whereby a blue emitting phosphor layer was formed.

Thereafter, 8 parts by weight of a green emitting rare earth oxysulfide phosphor and one part by weight of nitrocellulose were mixed with use of a solvent to obtain a coating dispersion of the phosphor. This coating dispersion of the phosphor was uniformly coated by means of a knife coater on the above mentioned blue emitting phosphor layer so that the coating weight of the phosphor became as shown in Table 1 given hereinafter, whereby a green emitting rare earth oxysulfide phosphor layer was formed. Further, nitrocellulose was uniformly coated on the green emitting rare earth oxysulfide phosphor layer to form a transparent protective layer having a thickness of about 10μ.

EXAMPLES 4 TO 13

Radiographic image conversion screens (4) to (13) were prepared in the following manner with use of the respective combinations of a green emitting rare earth oxysulfide phosphor and a blue emitting phosphor, as indicated in Table 1.

The green emitting rare earth oxysulfide phosphor and the blue emitting phosphor were preliminarily mixed in the proportions corresponding to the respective coating weights of the green emitting rare earth oxysulfide phosphor layer and the blue emitting phosphor layer. Eight parts of the phosphor mixture and one part of nitrocellulose were mixed together with a solvent to obtain a coating dispersion of the phosphors.

On the other hand, a protective layer was coated on a smooth substrate and dried to have a thickness of 10μ, and the above coating dispersion of the phosphors was then coated on the protective layer so that the total coating weight of the phosphors became 50 mg/cm$^2$. The coated phosphor layer was dried by leaving it to stand at a constant temperature of 15° C. for 10 hours while controlling the replacement of ambient air, whereby the green emitting rare earth oxysulfide phosphor grains and the blue emitting phosphor grains were settled to separate from one another.

Thereafter, the phosphor layer having the protective layer was peeled from the flat substrate and heat laminated on a support coated with a thermoplastic binder, whereby a radiographic image conversion screen comprising a double phosphor layer structure, i.e. a first fluorescent layer adjacent to the support and composed essentially of the blue emitting phosphor, and a second fluorescent layer on the surface side and composed essentially of the green emitting rare earth oxysulfide phosphor, was obtained.

EXAMPLE 14 TO 16

Fluorometallic radiographic image conversion screens (14) to (16) were prepared with use of the respecitve combinations of a green emitting rare earth oxysulfide phosphor and a blue emitting phosphor, as indicated in Table 2 given hereinafter, in the same manner as in Examples 4 to 13 except that a paper support having a thickness of 250μ and provided on its surface with a lead foil having a thickness of 30μ was used.

Reference Example R

As a reference example, a radiographic image conversion screen (R) was prepared in the same manner as described in Examples 4 to 13 except that $(Gd_{0.994}, Tb_{0.005}, Dy_{0.001})_2O_2S$ phosphor having a mean grain size of 9μ and a standard deviation (i.e. quartile deviation) of 0.30 was used and a single fluorescent layer having a coating weight of the phosphor of 50 mg/cm$^2$ was formed on the support.

Reference Example R'

A radiographic image conversion screen (R') was prepared in the same manner as in Examples 14 to 16 except that the same phosphor as used in Reference Example R was used.

With respect to 13 different kinds of the radiographic image conversion screens (1) to (13) of the present invention and the radiographic image conversion screen (R) prepared as a reference example, their speeds, sharpness, granularity and contrast were investigated as combined with an ortho-type film. The results thereby obtained are shown in Table 1. It is evident that the radiographic image conversion screens of the present invention are superior to the conventional radiographic image conversion screen (R) with respect to speed, sharpness and contrast, and no substantial degradation in their granularity was observed.

The radiographic image conversion screens (14) to (16) of the present invention and the radiographic image conversion screen (R') prepared as a reference example, were used for industrial non-destructive inspection. The results thereby obtained are shown in Table 2. The radiographic image conversion screens of the invention were found to be superior to the conventional radiographic image conversion screen (R') in the speed and penetrameter sensitivity. Further, it has been confirmed that the radiographic image conversion screens (14) to (16) can effectively used also for high voltage radiography and cobaltgraphy in medical diagnosis.

With respect to the radiographic image conversion screens (1) to (13) and (R): The speed, sharpness, granularity and contrast of each radiographic image conversion screen listed in Table 1 in combination with an ortho-G film (Manufactured by Eastman Kodak Co.) were obtained by radiography conducted with X-rays generated at an X-ray tube voltage of 80 KVp and passed through a water-phantom having a thickness of 80 mm. The values obtained and presented in the Tables are based on the following definitions.

Speed: A relative value based on the speed of the radiographic image conversion screen comprising a fluorescent layer of $CaWO_4$ phosphor (KYOKKO FS, manufactured by Kasei Optonix, Ltd. ) where the latter speed is set at 100.

Sharpness: A relative value of the MTF value obtained.

Sharpness: A MTF value was obtained at a spatial frequency of 2 lines/mm, and it was represented by a relative value based on the MTF value of a radiographic image conversion screen comprising a single fluorescent layer composed solely of $(Gd_{0.994}, Tb_{0.005}, Dy_{0.001})_2O_2S$ phosphor, obtained at the same spatial frequency, where the latter MTF value was set at 100.

Granularity: A RMS value at a film density of 1.0 and spatial frequency of 0.5 to 5.0 lines/mm.

Contrast: Photographs were taken through A1 having a thickness of 1 mm and A1 having a thickness of 2 mm, and the respective contrasts were obtained from the differences of the film densities. Each contrast was represented by a relative value based on the contrast obtained by a radiographic image conversion screen comprising a fluorescent layer composed of $CaWO_4$ phosphor (KYOKKO FS, manufactured by Kasei Optonix, Ltd.) where the latter contrast was set at 100.

With respect to the radiographic image conversion screens (14) to (16) and (R'): The speed and penetrameter sensitivity were obtained by radiography conducted with use of Ortho G Film (manufactured by Eastman Kodak Co.) and a steel plate having a thickness of 20 mm as the object and with X-rays generated at the X-ray tube voltage of 200 KVp.

Speed: A relative value based on the speed of the fluorometallic radiographic image conversion screen (R') where the latter is set up at 100.

Penetrameter sensitivity: Represented by the following formula.

$$\text{Penetrameter sensitivity} = \frac{\text{Distinguishable minimum wire diameter of penetrameter}}{\text{Thickness of the object}} \times 100$$

TABLE 1

| Radio graphic image conversion screens No. | Blue emitting phosphor (mean grain size, standard deviation) | Coating weights ($mg/cm^2$) | Green emitting rare earth oxysulfide phosphor (mean grain size, standard deviation) | Coating weights ($mg/cm^2$) | Speeds % | Sharpness (%) | Granularities (RMS value) | Contrast (%) |
|---|---|---|---|---|---|---|---|---|
| Reference (R) | — | — | $(Gd_{0.994}, Tb_{0.005}, Dy_{0.001})_2O_2S$ (9μ, 0.30) | 50 | 500 | 100 | $7.0 \times 10^{-3}$ | 90 |
| (1) | $(Y_{0.998}, Tb_{0.002})_2O_2S$ (5μ, 0.35) | 15 | $(Gd_{0.994}, Tb_{0.005}, Dy_{0.001})_2O_2S$ (9μ, 0.30) | 35 | 530 | 110 | $7.2 \times 10^{-3}$ | 100 |
| (2) | $(Gd_{0.5}, Y_{0.495}, Tb_{0.003}, Tm_{0.002})_2O_2S$ (5μ, 0.35) | 20 | $(Gd_{0.994}, Tb_{0.005}, Dy_{0.001})_2O_2S$ (9μ, 0.30) | 30 | 540 | 115 | $7.1 \times 10^{-3}$ | 95 |
| (3) | $(Gd_{0.3}, Y_{0.695}, Tb_{0.003}, Tm_{0.002})_2O_2S$ (5μ, 0.35) | 20 | $(Gd_{0.994}, Tb_{0.005}, Dy_{0.001})_2O_2S$ (9μ, 0.30) | 30 | 550 | 115 | $7.2 \times 10^{-3}$ | 98 |
| (4) | $(Gd_{0.6}, Y_{0.397}, Tb_{0.003})_2O_2S$ (5μ, 0.35) | 20 | $(Gd_{0.994}, Tb_{0.005}, Dy_{0.001})_2O_2S$ (9μ, 0.30) | 30 | 500 | 115 | 7.1 × 10−3 | 94 |
| (5) | $BaF_2.BaCl_2.0.1KCl.0.1BaSO_4$: $0.06Eu^{2+}$ (4μ, 0.34) | 15 | $(Gd_{0.994}, Tb_{0.005}, Dy_{0.001})_2O_2S$ (9μ, 0.30) | 35 | 500 | 110 | $7.1 \times 10^{-3}$ | 95 |
| (6) | $(Ba_{0.95}, Mg_{0.05})F_2.BaCl_2.0.01KCl$: $0.06Eu^{2+}$ (4μ, 0.34) | 10 | $(Gd_{0.994}, Tb_{0.005}, Dy_{0.001})_2O_2S$ (9μ, 0.30) | 40 | 500 | 108 | $7.0 \times 10^{-3}$ | 94 |
| (7) | $(La_{0.997}, Tb_{0.003})OBr$ (5μ, 0.33) | 20 | $(Gd_{0.994}, Tb_{0.005}, Dy_{0.001})_2O_2S$ (9μ, 0.30) | 30 | 530 | 105 | $7.1 \times 10^{-3}$ | 95 |
| (8) | $(Zn_{0.9}, Cd_{0.1})S:Ag$ (4μ, 0.35) | 20 | $(Gd_{0.994}, Tb_{0.005}, Dy_{0.001})_2O_2S$ (9μ, 0.30) | 30 | 500 | 110 | $7.5 \times 10^{-3}$ | 96 |
| (9) | $Y(Ta_{0.95}, Nb_{0.05})O_4$ (5μ, 0.30) | 15 | $(Gd_{0.994}, Tb_{0.005}, Dy_{0.001})_2O_2S$ (9μ, 0.30) | 35 | 550 | 120 | $7.2 \times 10^{-3}$ | 100 |
| (10) | $CaWO_4$ (4μ, 0.35) | 10 | $(Gd_{0.994}, Tb_{0.005}, Dy_{0.001})_2O_2S$ (9μ, 0.03) | 40 | 500 | 115 | $7.0 \times 10^{-3}$ | 93 |
| (11) | $(Y_{0.999}, Tb_{0.001})_2O_2S$ (5μ, 0.35) | 20 | $(Gd_{0.995}, Tb_{0.004}, Pr_{0.001})_2O_2S$ (10μ, 0.30) | 30 | 550 | 115 | $7.3 \times 10^{-3}$ | 90 |
| (12) | $(Y_{0.999}, Tb_{0.001})_2O_2S$ (5μ, 0.35) | 20 | $(La_{0.994}, Tb_{0.005}, Yb_{0.001})_2O_2S$ (8μ, 0.31) | 30 | 500 | 115 | $7.3 \times 10^{-3}$ | 98 |
| (13) | $(Y_{0.999}, Tb_{0.001})_2O_2S$ (5μ, 0.35) | 20 | $(La_{0.994}, Tb_{0.005}, Nd_{0.001})_2O_2S$ (8μ, 0.32) | 30 | 500 | 113 | $7.3 \times 10^{-3}$ | 98 |

TABLE 2

| Radio graphic image conversion screens No. | Blue emitting phosphor (mean grain size, standard deviation) | Coating weights ($mg/cm^2$) | Green emitting rare earth oxysulfide phosphor (mean grain size, standard deviation) | Coating weights ($mg/cm^2$) | Speeds (%) | Penetrameter sensitivities (%) |
|---|---|---|---|---|---|---|
| (R') | — | — | $(Gd_{0.994}, Tb_{0.005}, Dy_{0.001})_2O_2S$ (9μ, 0.30) | 50 | 100 | 1.5 |
| (14) | $(Y_{0.998}, Tb_{0.002})_2O_2S$ (5μ, 0.35) | 20 | $(Gd_{0.994}, Tb_{0.005}, Dy_{0.001})_2O_2S$ (9μ, 0.30) | 30 | 110 | 1.8 |
| (15) | $(Gd_{0.3}, Y_{0.695}, Tb_{0.005})_2O_2S$ (5μ, 0.35) | 20 | $(Gd_{0.994}, Tb_{0.005}, Dy_{0.001})_2O_2S$ (9μ, 0.30) | 30 | 105 | 1.7 |
| (16) | $BaF_2.BaCl_2.0.1KCl.0.1BaSO_4$: $0.06\ Eu^{2+}$ (4μ, 0.35) | 15 | $(Gd_{0.994}, Tb_{0.005}, Dy_{0.001})_2O_2S$ (9μ, 0.30) | 35 | 105 | 1.7 |

We claim:

1. A radiographic image conversion screen, consisting essentially of:

(a) a support;

(b) a first fluorescent layer formed on said support consisting essentially of at least one blue emitting phosphor which is selected from the group consisting of (I) a yttrium-gadolinium oxysulfide phosphor represented by the formula $$(Y_{1-c-d-e'}Gd_{c'}Tb_{d'}Tm_e)_2O_2S$$

where c, d and e are numbers within the ranges of 0≦c≦0.60, 0.0005≦d≦0.02 and 0≦e0.01, respectively, and (II) a rare earth oxyhalide phosphor represented by the formula $$(Ln'_{1-x-y-z'}Tb_{x'}Tm_{y'}Yb_z)OX$$

where Ln is at least one element selected from the group consisting of lanthanum and gadolinium, X is at least one selected from chlorine and bromine, and x, y and z are numbers within the ranges of 0≦x≦0.01, 0≦y≦0.01, 0≦z≦0.005 and 0<x+y; and (c) a second fluorescent layer formed on said first fluorescent layer consisting essentially of a green emitting rare earth oxysulfide phosphor represented by the formula:

$$(Ln_{1-i-a-b'}Y_{i'}Tb_{a'}R_b)_2O_2S$$

where Ln is at least one element selected from the group consisting of La, Gd and Lu, R is at least one element selected from the group consisting of Dy, Pr, Yb and Nd, and i, a and b are numbers within the ranges of $0 \leqq i \leqq 0.35$, $0.0005 \leqq a \leqq 0.09$ and $0.0002 \leqq b \leqq 0.01$, respectively.

2. The radiographic image conversion screen according to claim 1 wherein the phosphor in the blue emitting phosphor layer has a mean grain size of from 2 to 10μ, a standard deviation (quartile deviation) of the grain size of from 0.20 to 0.50 and a coating weight of from 2 to 100 mg/cm$^2$, and the phosphor in the green emitting rare earth oxysulfide phosphor layer has a mean grain size of from 5 to 20μ, a standard deviation (quartile deviation) of the grain size of from 0.15 to 0.40 and a coating weight of from 5 to 100 mg/cm$^2$.

3. The radiographic image conversion screen according to claim 2, wherein the phosphor in the blue emitting phosphor layer has a mean grain size of from 3 to 6μ, a standard deviation (quartile deviation) of the grain size of from 0.30 to 0.45 and a coating weight of from 3 to 50 mg/cm$^2$, and the phosphor in the green emitting rare earth oxysulfide phosphor layer has a mean grain size of from 6 to 12μ, a standard deviation (quartile deviation) of the grain size of from 0.20 to 0.35 and a coating weight of from 20 to 80 mg/cm$^2$.

4. The radiographic image conversion screen according to claim 1 wherein the blue emitting phosphor layer has a grain size distribution of the phosphor grains such that the grain size gradually becomes smaller from the side facing the green emitting rare earth oxysulfide phosphor layer to the side facing the support.

5. The radiographic image conversion according to claim 1 wherein a reflective layer is interposed between the support and the first fluorescent layer.

6. The radiographic image conversion screen according to claim 1 wherein an absorptive pigment layer is interposed between the support and the first fluorescent layer.

7. The radiographic image conversion screen according to claim 1 wherein a metal foil is interposed between the support and the first fluorescent layer.

* * * * *